United States Patent [19]
Hahn

[11] Patent Number: 6,070,283
[45] Date of Patent: Jun. 6, 2000

[54] DOCK LEVELER WITH INTEGRAL BUMPERS

[75] Inventor: Norbert Hahn, Franklin, Wis.

[73] Assignee: Rite-Hite Holding Corporation, Milwaukee, Wis.

[21] Appl. No.: 09/113,695

[22] Filed: Jul. 10, 1998

[51] Int. Cl.[7] .................................................. E01D 1/00
[52] U.S. Cl. ............................................ 14/71.1; 14/69.5
[58] Field of Search .................... 14/69.5, 71.5, 14/71.1, 71.3

[56] References Cited

U.S. PATENT DOCUMENTS

| | | | |
|---|---|---|---|
| 3,203,002 | 8/1965 | McGuire | 14/71.3 |
| 3,440,673 | 4/1969 | Kelley | 14/71.3 |
| 3,493,984 | 2/1970 | Reinhard | 14/71.3 |
| 3,570,033 | 3/1971 | Hovestad et al. | 14/71.3 |
| 3,840,930 | 10/1974 | Wanddell | 14/71.3 |
| 4,420,849 | 12/1983 | Alten | 14/71.3 |
| 4,682,382 | 7/1987 | Bennett | 14/71.3 |
| 4,744,121 | 5/1988 | Swessel et al. | 14/71.1 |
| 5,450,643 | 9/1995 | Warner | 14/71.3 |
| 5,644,812 | 7/1997 | Neufeldt et al. | 14/71.3 |
| 5,651,155 | 7/1997 | Hodges et al. | 14/71.3 |
| 5,775,044 | 7/1998 | Styba | 52/173.2 |
| 5,881,414 | 3/1999 | Alexander | 14/71.1 |

FOREIGN PATENT DOCUMENTS

| | | |
|---|---|---|
| 0 040 388 A1 | 5/1981 | European Pat. Off. . |
| 28 00 128 A1 | 7/1979 | Germany . |
| 196 12 135 A1 | 10/1997 | Germany . |
| 297 16 877 U | 2/1998 | Germany . |
| 685 177 A5 | 3/1995 | Switzerland . |
| 1161537 | 8/1969 | United Kingdom . |

OTHER PUBLICATIONS

*International Search Report* concerning International Application Serial No. PCT/US99/14867, European Patent Office, dated Mar. 11, 1999, 8 pages.

Drawing "Adjustable Bottom Pad (692–0029)"; dated Oct. 17, 1985 showing a vertically adjustable pad mounted to the dock face.

Spec Sheet "Loading Systems Mobile Dock Bumper RB 250M"; dated circa 1993; showing a vertically–adjustable spring–loaded dock bumper.

Drawing "Höhenbeweglicher Anfahrpuffer 5146.0102"; dated Nov. 1995; showing a vertically–adjustable, spring–loaded dock bumper.

*Primary Examiner*—Thomas B. Will
*Assistant Examiner*—Kristine Markovich
*Attorney, Agent, or Firm*—Marshall, O'Toole, Gerstein, Murray & Borun

[57] ABSTRACT

A dock leveler mountable in a pit including a rear wall, the leveler including a deck with a front end and that is capable of pivotal movement relative to the rear wall; a lip capable of movement to a substantially coplanar position relative to the deck; and a bumper mounted adjacent the deck front end beyond the lateral width of the lip.

6 Claims, 5 Drawing Sheets

DOCK LEVELER WITH INTEGRAL BUMPERS

FIELD OF THE INVENTION

The present application discloses a dock leveler, and particularly a dock leveler including a widened deck member carrying integral dock bumpers.

BACKGROUND OF THE INVENTION

Dock levelers are widely used to facilitate the loading and unloading of vehicles at a loading dock. The dock leveler forms a bridge between the building, such as a warehouse or distribution facility, and the back end of the vehicle being loaded or unloaded. A gap typically exists between the building exterior wall and the rear end of the vehicle by virtue of the fact that the vehicle engages against bumpers on the exterior wall. The bumpers are disposed on the wall to protect both the vehicle and the wall against the damage that would result from the vehicle directly engaging the wall. A set of bumpers B, disposed on either side of a dock leveler D, are shown in the prior art FIG. 1. To bridge the gap thus formed, a dock leveler typically employs a deck member, labeled M in FIG. 1, that is hingedly connected about its rear end at H to a support structure disposed within a pit P. Hingedly connected to the front end of the deck D is a lip L which is movable between a downwardly hanging, stored or "pendant" position and the extended position shown in FIG. 1. In the extended position, the lip would be placed in the rear of the vehicle being loaded or unloaded to bridge the gap from the vehicle into the building, and to facilitate loading and unloading. The hinged connection H of the deck to the supporting structure allows the entire leveler to move up and down with the vehicle as it is loaded and unloaded. As a vehicle is unloaded its suspension will tend to raise the floor of the vehicle, and thus the leveler itself. Similarly, as a vehicle is loaded the weight of the cargo will tend to depress the floor of the vehicle against the suspension. Dock levelers are also vertically adjustable in this manner as vehicles are disposed at a wide variety of heights relative to the roadway.

Figure 1:
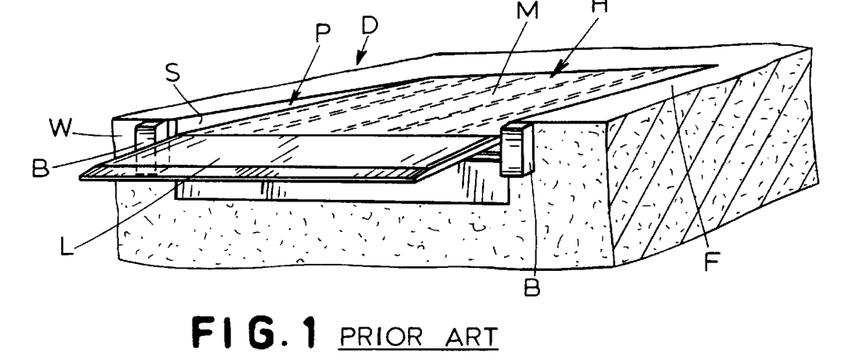
FIG. 1 is a prior art figure showing a conventional dock leveler and the orientation of conventional dock bumpers with the leveler in a below-dock position.

In a typical installation, a pit is formed for receiving the dock leveler. The pit is indicated generally in FIG. 1 by the reference letter P. The pit provides space for the leveler itself, as well as for the actuation mechanism for raising and moving the leveler into its operating positions, and returning it to a stored position. The dock bumpers B are typically disposed on the vertical exterior building wall just laterally of the pit sidewalls. Under certain conditions, this arrangement can be problematic. In FIG. 1, the dock leveler is shown in a so-called below dock position. That is, the deck is disposed at a declined angle with respect to the floor F surrounding the pit P. As can be seen from FIG. 1, the front wall W of the building and the side wall S of the pit P thus form ledges at the front and side edges of the deck, respectively. Certain vehicles to be loaded or unloaded with the leveler may be wider than the width of the dock leveler. In such a situation, the presence of the ledges when the deck is in a below dock position may be a significant impediment to unloading the vehicle. For example, if a load were being removed from a vehicle with a fork truck disposed on the leveler in FIG. 1, and if that load had a width such that a portion of it extended beyond the lateral edge of the lip L and if, for example, there were insufficient headroom inside the vehicle preventing the load from being elevated, that cargo could strike the front wall W of the loading dock or the bumper B, leading to damage of the cargo and/or impeding the efficiency of the unloading process. For this reason, facilities that service a large number of wide vehicles (i.e., vehicles wider than the width of standard dock levelers) often employ truck levelers. Truck levelers are lifts that can lift the vehicle to a raised position relative to the loading dock, so that the vehicle can be serviced by a dock leveler without the need for the dock leveler to assume a below dock position as in FIG. 1, thus avoiding interference between the cargo and the dock wall W or bumper B. The problem of the front wall of the building and the side wall of the dock leveler pit forming a barrier to free and easy movement of cargo being loaded and unloaded could also be solved simply by having a dock leveler of a wider width. However, if a standard dock leveler were as wide a the vehicle itself, there would not be dock wall available for the purpose of mounting bumpers. Thus, there would be the risk that the vehicle would back directly into the leveler, damaging both the leveler and the vehicle itself including impeding the functionality of the dock leveler.

SUMMARY OF THE INVENTION

There is thus provided a dock leveler preferably of increased width, and which includes integrally-mounted bumpers. In a preferred embodiment, the deck of the dock leveler is wider than the lip, with the leveler extending laterally beyond the width of the lip on each side. Mounted to the front end of the deck, and disposed laterally to the lip, are the integral bumpers. These bumpers extend from the front end of the deck to a significant projection in front of the lip to ensure that the parking vehicle cannot back into the lip as it approaches the dock. A spacer member may preferably be included in the bumper assembly. Such a spacer is disposed adjacent the front end of the deck. The remainder of the bumper assembly is then mounted to the spacer member. The spacer insures that the bumper is disposed in front of the lip when the lip is in a pendant position to maintain a gap between the rear of the vehicle and the pendant lip. The spacer member may preferably include an access hole to allow insertion and removal of the hinge pin which hinges the lip to the deck. Alternatively, the spacer may be provided with an access notch for the hinge pin. Since the bumpers integrally carried on the deck will now be subject to the impact of the backing truck, which impact would conventionally be dispersed into the building wall, the dock leveler disclosed herein preferably includes a bumper support structure to absorb and distribute the additional forces exerted on the dock leveler by the vehicle contacting the integral bumpers. In a representative embodiment, the support structure includes a structural member disposed between a rear portion of the deck and the upstanding rear wall of the dock leveler pit.

The dock leveler with integral bumpers disclosed herein assists in solving the problems typically associated with loading and unloading vehicles having a width greater than the width of the dock leveler, particularly in below dock situations. At the same time, it provides a solution that is economical, simple of construction that does not require a significant number of moving parts, and can provide a larger, unimpeded maneuvering surface for enhancing lift truck operation and safety.

DETAILED DESCRIPTION OF THE PREFERRED EMBODIMENTS

Figure 2:
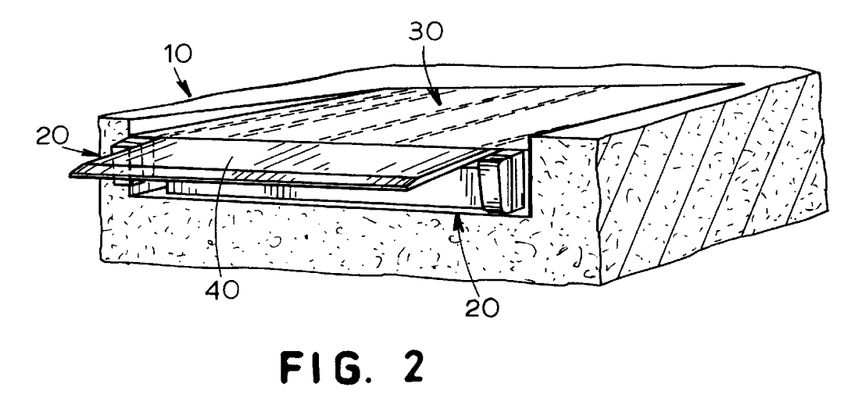
FIG. 2 is a perspective view of a dock leveler with integral bumper shown in a below-dock position.
Figure 3:
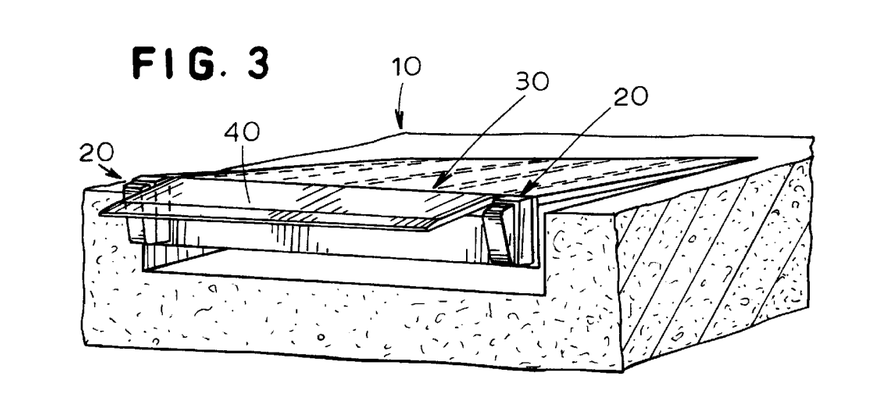
FIG. 3 is the dock leveler of FIG. 2 shown in an above-dock position.
Figure 4:
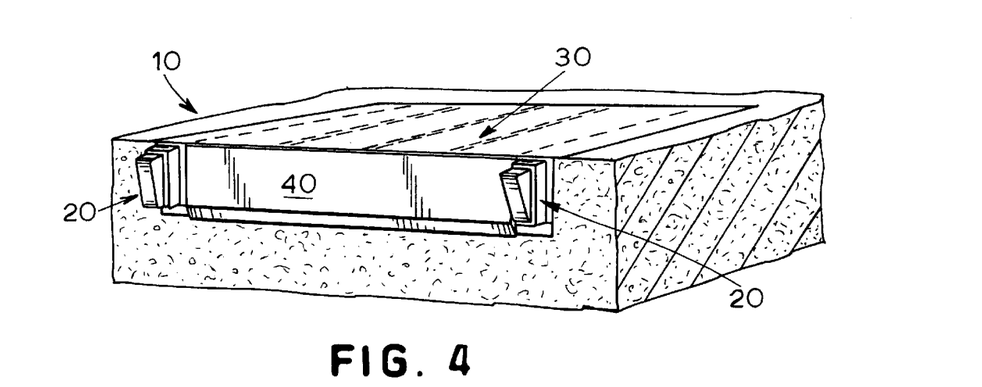
FIG. 4 is the dock leveler of FIG. 2 shown in the stored position, with the lip pendant.

Dock leveler 10 including integral dock bumpers 20 is depicted in FIGS. 2 through 4 in an operative, below-dock position; an operative above-dock position; and a stored position, respectively. It will be apparent to one of skill in the art that the above and below dock positions in the Figures are representative, and that more extreme deck angles are possible, as levelers are typically capable of operating from 12 inches (30.5 cm) above to 12 inches (30.5 cm) below dock level. In FIG. 2, the leveler 10, including a deck 30 and a lip 40, shows lip 40 in the extended position relative to the deck 30. The term "deck" as used herein is intended to encompass not only the plate over which traffic passes, but ineed the various supporting structure (stringers, I-beams, headers, gussets and the like) making up the entire re-enforced platform. Much of the supporting structure included in the "deck" is seen most clearly in the plan view of FIG. 5. Returning to FIGS. 2–4, it will be appreciated by one of skill in the art that with lip 40 in the extended position as shown in FIGS. 2 and 3, it will typically be disposed on the vehicle being loaded and unloaded to bridge the gap between that vehicle and the deck 30. The vehicle is not shown in FIGS. 2–4. As a comparison of FIG. 2 to prior art FIG. 1 reveals, the provision of the wide deck 30 with integral bumpers 20 mounted at the front end thereof, serves to widen the effective operating area of the dock leveler. In previous levelers like that shown in FIG. 1, below dock loads extending laterally beyond the width of the lip, and that could not be elevated above lip 30 because of space or equipment limitations, could not be withdrawn from the vehicle because of the presence of the barrier presented by the vertical dock wall W upon which the dock bumper B had to be mounted. Extending the deck laterally and mounting the bumpers 20 on that extended width eliminates this problem or conventionally-mounted bumpers. That is, loads can now extend laterally beyond the width of the lip without being exposed to the barrier of the dock wall itself, since the bumpers are now fixed in position at or slightly beneath the level of the deck, regardless of the deck's orientation. At the same time, the necessary and desirable functions of dock bumpers (protecting the vehicle and the dock equipment from damage caused by impact between the vehicle and that equipment and properly spacing the vehicle relative to the leveler to allow proper leveler operation) are realized.

FIG. 3 shows the leveler 10 including integral dock bumpers in an above-dock position. The wider deck 30, as compared to a prior art leveler, gives the dock attendant a wider area over which to travel and operate without being concerned for running off the edge of the leveler at the step formed by the deck 30 raised above the dock floor D. Again, in prior art configurations where the desired separation between the dock bumpers required a narrower pit, this operating width of the upper deck in an above-dock position was more narrow.

FIG. 4 shows the leveler 10 in the stored or "cross-traffic" position where the top of the deck 30 is coplanar with the surrounding dock floor D and the lip 40 is in its folded or pendant position. The integral dock bumpers 20 extend forward of the folded lip 40 so that the vehicle approaching the loading dock will engage in impact against the bumpers 20 and remain spaced from the remaining components of the dock leveler when in the parked position.

Figure 5:
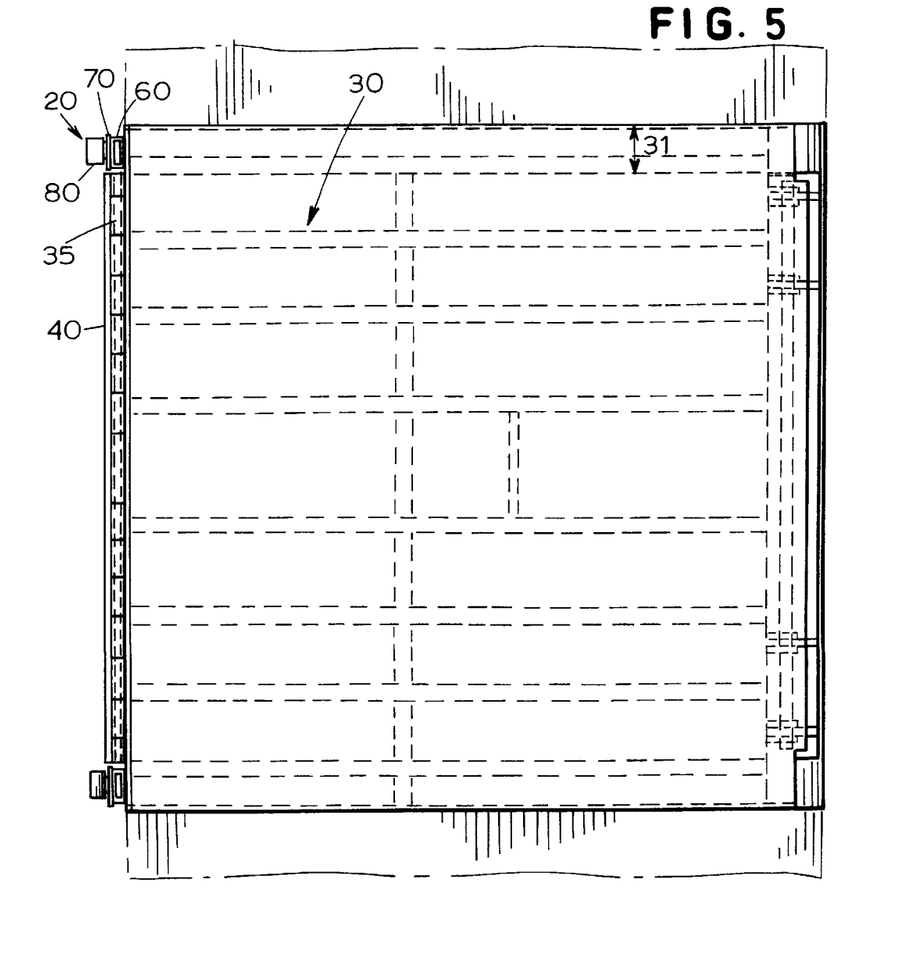
FIG. 5 is a top plan view of the dock leveler with integral bumpers of FIG. 2.

A more detailed view of leveler 10, including integral dock bumpers 20 is shown in the top plan view of FIG. 5. The leveler 10 is shown with the lip 40 in its folded position relative to deck 30. The hinged connection 35 between lip 40 and deck 30 is also shown. In order to place integral dock bumper 20 in a position in front of lip 40 (to the left in the sense of FIG. 5), the bumper may illustratively include a spacer member 60. The spacer member 60, as will be described in greater detail below, is illustratively mounted directly on the structure of deck 30. A base plate 70 for the integral bumper is then mounted to the front face of spacer member 60. The contact member 80 of the integral dock bumper is then mounted on the base plate 70 in a way to be described in greater detail below. As a result, bumpers 20 have a contact surface for the approaching vehicle disposed forward of the lip 40 and which will maintain a space between the rear of the vehicle and the lip 40 once the vehicle engages against the bumpers 20.

Figure 6:
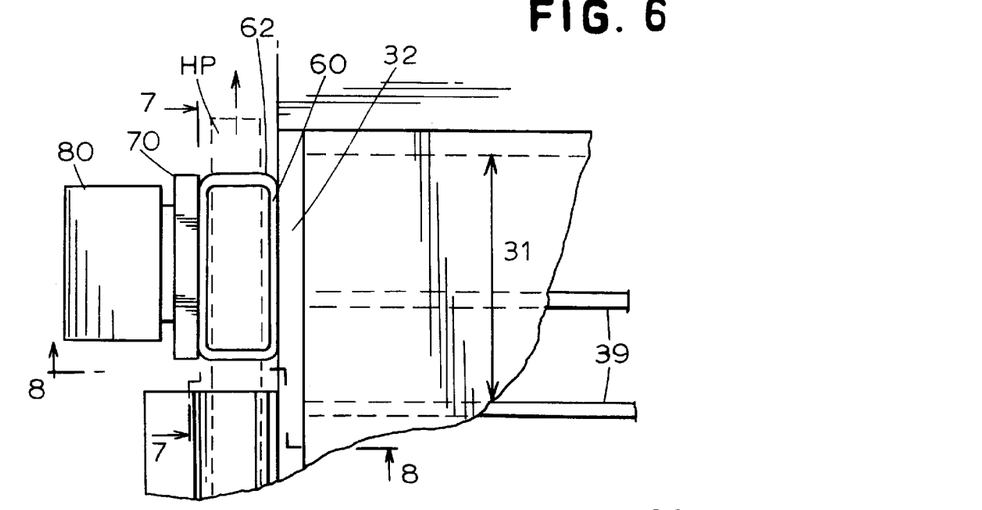
FIG. 6 is a detailed view showing the connection of the integral dock bumper to the dock leveler of FIG. 2.
Figure 7:
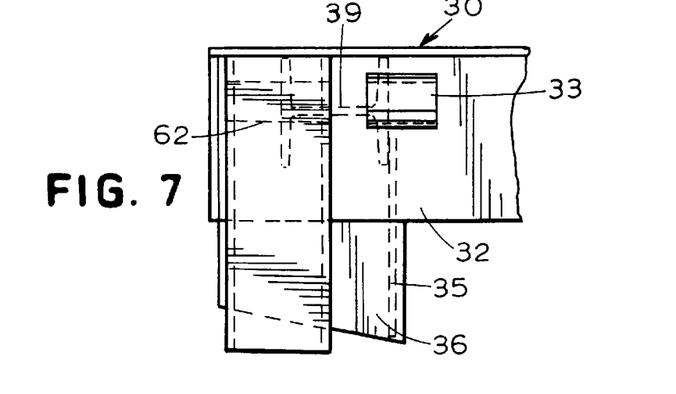
FIG. 7 is a front detailed elevation showing the mounting and support of the spacer member from the leveler of FIG. 2.

Further detailed views of the mounting of integral dock bumper to the deck 30 are shown in FIGS. 6 and 7. In the top detail view of FIG. 6, it can be seen that in this embodiment the spacer member 60 is an open rectangular tube. Illustratively, that tube 60 is welded to a front header 32 of the deck 30. Header 32 is simply a plate of structural steel that is typically dependent perpendicularly from the deck 30, and to which are mounted the hinge spools 33 which mate with similar hinge spools on the lip to form the hinge 35 between the lip 40 and the deck 30. It is to this header 32 that spacer member 60 is welded. Given that the vertical extent of the spacer member 60 extends beyond the vertical extent of the header 32, a gusset plate such as 36 may be welded to the bottom of the header 32 to give enhanced structural support to the spacer member 60 since it will be assisting in absorbing and transferring the impact of the backing vehicle. FIG. 7 also shows that the gusset plate 36 is further supported by an additional structure member 38 welded between the gusset plate 36 and an I beam 39 welded to the under side of the deck 30. These components, header 32, gusset plate 36, structure member 38, and I beam 39 form a front portion of a bumper support structure 100, to be discussed in further detail below.

As shown in FIGS. 6 and 7, spacer member 60 is disposed adjacent to hinge spool 33 on the header 32. To assemble the lip 40 to the deck 30, the complimentary hinge spools on the deck and lip are aligned and a hinge pin is then passed through the hinge 35 to secure the two members together. The spacer member 60, being disposed just adjacent to the last hinge spool 33 on the header must therefore include some access to the aligned hinge spools so that the hinge pin can be inserted. Similarly, access to the hinge spool is important in the event that the hinge pin needs to be removed for the purpose of repairing or servicing the dock leveler. Toward that end, spacer member 60 includes a hinge pin access hole 62 which is aligned with the central opening in the hinge spool 33 to allow hinge pin HP (shown being withdrawn in FIG. 6) to be inserted and withdrawn into the hinge 35 as desired.

Figure 12:
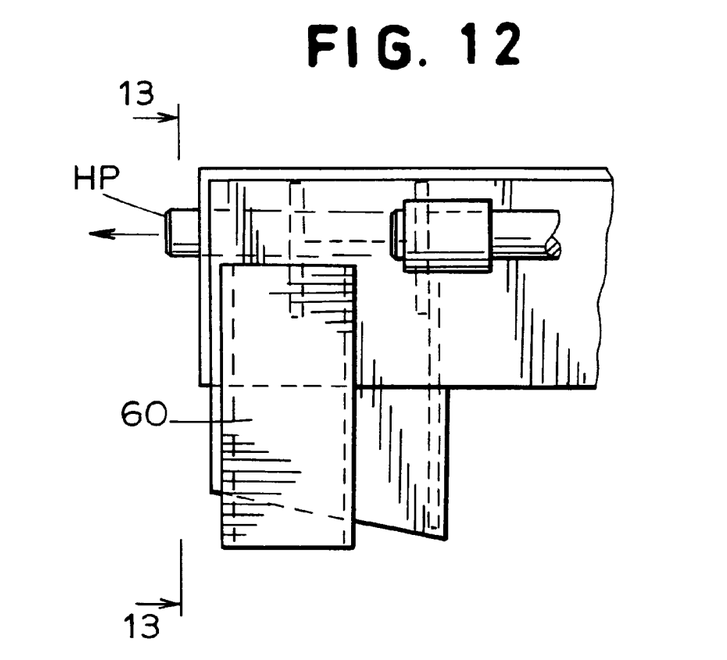
FIG. 12 is a front elevation of an alternative embodiment for the spacer member of the dock leveler of FIG. 2.
Figure 13:
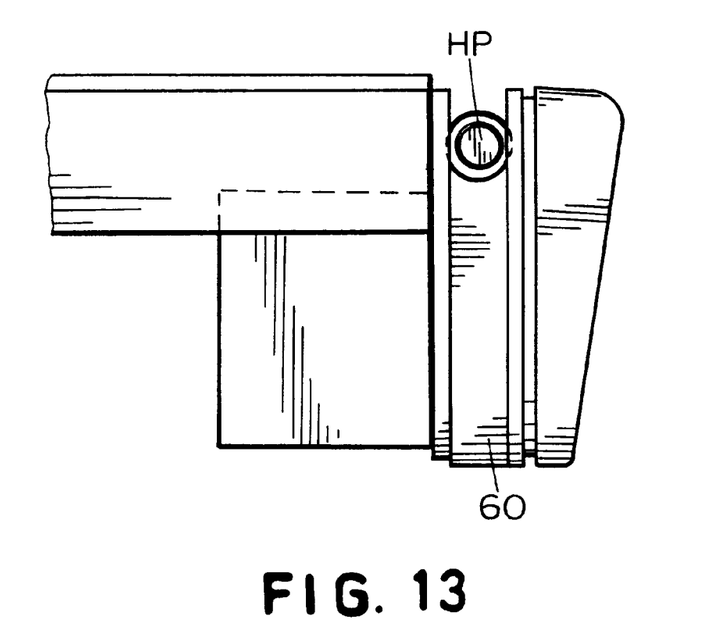
FIG. 13 is a side elevation of the alternative spacer member of FIG. 12.

Alternatively, spacer 60 may be notched or vertically truncated to allow access to the hinge pin, as shown in FIGS. 12 and 13. One of skill in the art will appreciate that other means of providing access to the hinge pin through bumper 20 are possible.

Returning to FIG. 6, it also shows the remainder of the bumper structure in greater detail, comprising back plate 70 and contact member 80. The presently-preferred bumper configuration for the integral bumper on the dock leveler 10 is one having a construction similar to a dock bumper sold by Rite-Hite Aftermarket Corporation under the model name "Dok-Saver" bumper. In such a construction, contact member 80 is a formed steel box with an opening in the back. Base plate 70 includes a mounting structure that protrudes into the contact member 80 through the opening in the back. An elastic material (not shown) in the interior of the contact member 80 helps to dissipate the force exerted on the bumper 20 by contact with the vehicle, and helps bias the contact member 80 outwardly with respect to the base plate 70.

Figure 8:
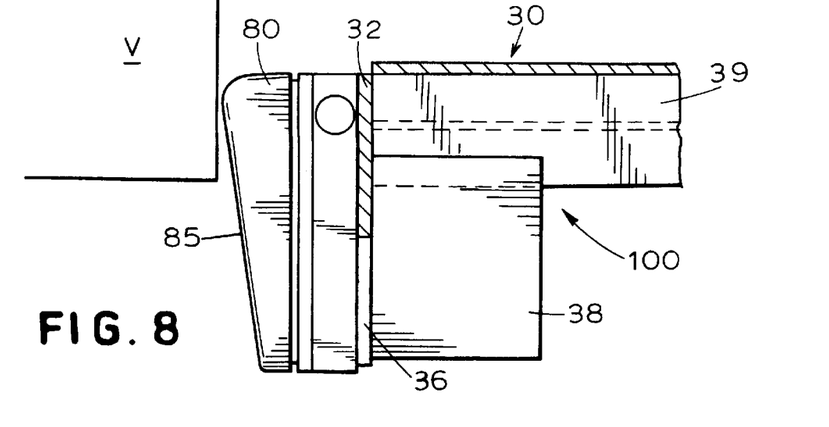
FIG. 8 is a side elevation showing the mounting of the integral bumper to the leveler of FIG. 2.

To facilitate insertion and removal of the integral bumper 20 from its position between the rear of a parked vehicle and the leveler, the front, contact surface 85 of the contact member may be tapered from top to bottom, as seen most clearly in FIG. 8. In operation, leveler 10 will typically be in the stored position (FIG. 4) when the vehicle backs into the dock. Although the vehicle V will typically "bounce" off of the bumpers, it is possible for the vehicle V to park with a portion of the vehicle "snug" to the bumpers, as shown in FIG. 8. To allow the lip 40 to attain its extended position relative to deck 30, the deck is typically raised upward until the lip 40 clears the vehicle, at which time lip 40 is extended, and deck 30 and extended lip 40 move downward to engage the vehicle. With vehicle V tight against bumpers 20, upward rotation of deck 30 could be hampered by frictional engagement between the vehicle and a front surface of bumpers 20. Tapering of surface 85 minimizes this problem.

Moreover, this tapering facilitates downward movement of the deck 30 and extended lip 40. If vehicle V slips backward (to the right in the sense of FIG. 8) when the deck is raised, it may be necessary to wedge bumpers 20 back into the gap between the vehicle and the building wall. Tapering of surface 85 allows for such wedging as it forms a camming surface tending to move vehicle V away from the dock as the deck 30 is lowered. It may be advantageous or necessary in certain applications to power deck 30 downward in order to force the bumpers 20 back into the gap. One of skill in the art will appreciate that the size of this gap may vary between the two bumpers due to such factors as the level and grade of the driveway, whether the vehicle is parked or approaching square to the dock, and the structural irregularities of the vehicle itself.

Figure 9:
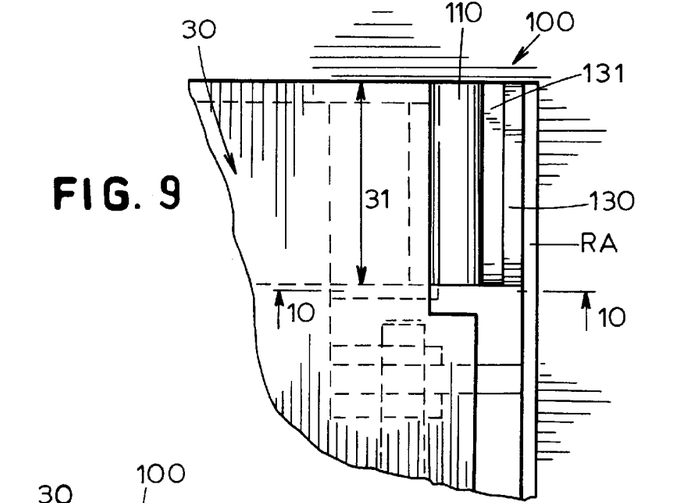
FIG. 9 is a top plan detail of the support structure of the dock leveler of FIG. 2.
Figures 10, 11:
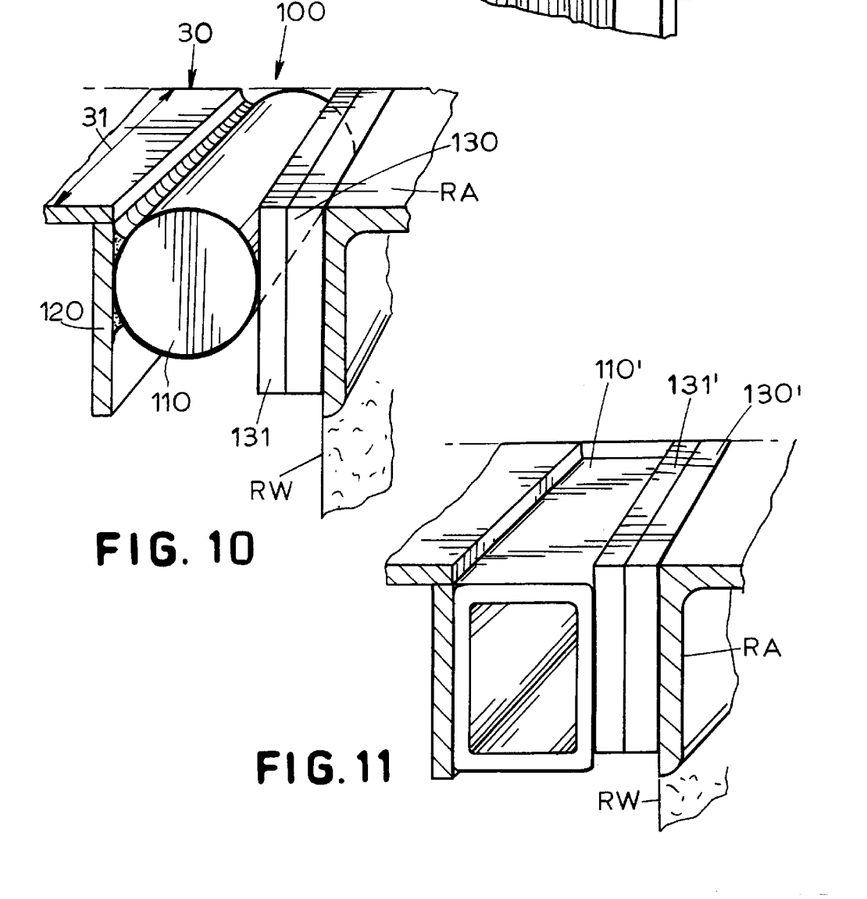
FIG. 10 is a perspective view of the support structure of FIG. 9.
FIG. 11 is an alternative embodiment of a support structure for the leveler of FIG. 2.

To assist leveler 10 in absorbing and dispersing the impact forces caused by the vehicle impacting bumpers 20, a bumper support structure 100 may be included. Preferably, the support structure 100 is disposed between the portion of the deck behind the bumpers 20, and the rear wall RW of the pit P. Support structure 100, illustratively includes: I-beam 39, cooperating with front structure shown in FIGS. 6–8, and the rear structure shown in FIGS. 9 and 10. FIGS. 5 and 6 shows the widened deck section 31 to which one of bumpers 20 is mounted. FIG. 9 shows a detailed plan view of the rear portion of that section 31, and the rear portion of support structure 100, and FIG. 10 shows it in perspective. Conventionally a rear angle R.A. is fixed to the corner formed by the rear wall of the pit P, and the surrounding floor. Rear angle RA is thus an extension of the rear wall RW of the pit P. The support structure 100 in FIGS. 9 and 10 includes a bearing or force distribution member in the form of a cylindrical rod 110. Rod 110 is disposed between the rear end of deck 30 and the rear wall RW of the pit P (i.e., rear angle R.A.). Rod 110 is mounted to deck 30 by being welded to a section of rear header 120 depending from and mounted to deck section 31. Other means of mounting rod 110 to deck 30 will be apparent to one of skill in the art. Disposed between rod 110 and affixed to rear angle R.A. are plates or shims 130, 131. These plates 130, 131 help to distribute the impact forces on deck 30 across the rear wall RW of the pit P, and also serve to ensure a bearing engagement (i.e., no gaps) between rod 110 and the rear angle R.A. Round stock 110 was chosen as the preferred structure for the bearing or force distribution member as it gives the most consistent bearing engagement between the rear of the deck 30 and the pit wall, while also minimizing the depression presently encountered by fork truck wheels in passing thereover.

An alternative bearing or force distribution member is shown in FIG. 11 in the form of a box beam 110'. While an even smaller depression is formed as compared to rod 110, one of skill in the art will appreciate that the square corners of this structure may cause undesirable friction and binding with plates 130', 131' as the deck 30 pivots up and down about its rear hinge.

There have thus been disclosed dock levelers having integral bumpers disposed on a front edge of the deck beyond the width of the lip. A bumper support structure is disposed between the bumper and the rear of the pit to assist in distributing and dispersing impact forces on the bumpers into the surrounding pit.

What is claimed is:

1. An impactable dock leveler mountable in a pit including a rear wall, and comprising: a deck that includes a front end and which is capable of pivotal movement relative to the rear wall; a lip capable of movement to a position where the lip forms a substantially co-planar extension of the deck, the lip having a width and the deck having a width greater than the width of the lip to define a section of the deck beyond the width of the lip; and at least one bumper mounted to the deck for movement therewith as the deck pivots, the at least one bumper being mounted adjacent the front end of the deck and on the section of the deck beyond the width of the lip, and the deck further comprising a bumper support structure disposed between the at least one bumper and the rear wall of the pit and including a force distribution member fixed adjacent a rear end of the deck and adapted to bearingly engage the pit rear wall.

2. The dock leveler of claim 1 wherein a spacer plate is disposed between the force distribution member and the pit rear wall.

3. The dock leveler of claim 1, wherein the bumper comprises a spacer member mounted to the deck front end, a back plate, and a contact member mountable on the back plate.

4. The dock leveler of claim 3, wherein the contact member includes a contact face that tapers from top to bottom.

5. The dock leveler of claim 3, wherein the lip is pivotally mounted to the deck by a hinge pin, and wherein the bumper includes a hinge pin access hole.

6. The dock leveler of claim 5, wherein the access hole is in the spacer member.

* * * * *

UNITED STATES PATENT AND TRADEMARK OFFICE
CERTIFICATE OF CORRECTION

PATENT NO.    : 6,070,283
DATED         : June 6, 2000
INVENTOR(S)   : Norbert Hahn It is certified that error appears in the above-identified patent and that said Letters Patent is hereby corrected as shown below:

Title page,
Item [56], FOREIGN PATENT DOCUMENTS, please delete "685177" and insert -- 685117 --.

Signed and Sealed this

Twenty-seventh Day of May, 2003

JAMES E. ROGAN
*Director of the United States Patent and Trademark Office*